United States Patent
Yadav et al.

(10) Patent No.: US 11,431,793 B1
(45) Date of Patent: Aug. 30, 2022

(54) SYSTEM AND METHOD USING PEER-TO-PEER CONNECTIONS WITH ULTRA-WIDEBAND FOR AN INTERACTION

(71) Applicant: Bank of America Corporation, Charlotte, NC (US)

(72) Inventors: Durgesh Singh Yadav, Greater Noida (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/650,017

(22) Filed: Feb. 4, 2022

(51) Int. Cl.
| | |
|---|---|
| *G06F 15/16* | (2006.01) |
| *G06F 9/54* | (2006.01) |
| *H04L 29/06* | (2006.01) |
| *H04L 67/104* | (2022.01) |
| *H04L 67/1061* | (2022.01) |

(52) U.S. Cl.
CPC ...... *H04L 67/1046* (2013.01); *H04L 67/1068* (2013.01)

(58) Field of Classification Search
CPC .......... H04L 67/1046; H04L 67/1068
USPC ........................................ 709/204
See application file for complete search history.

(56) References Cited

U.S. PATENT DOCUMENTS

| | | | |
|---|---|---|---|
| 7,774,231 B2 | 8/2010 | Pond et al. | |
| 8,249,965 B2 | 8/2012 | Tumminaro | |
| 8,768,934 B2 | 7/2014 | Jones et al. | |
| 8,838,477 B2 | 9/2014 | Moshfeghi | |
| 8,905,303 B1 | 12/2014 | Ben Ayed | |
| 9,036,509 B1 | 5/2015 | Addepalli et al. | |
| 9,047,600 B2 | 6/2015 | Zhou et al. | |
| 9,083,581 B1 | 7/2015 | Addepalli et al. | |
| 9,253,589 B2 | 2/2016 | Mccann et al. | |
| 9,330,561 B2 | 5/2016 | Proud | |
| 9,576,295 B2 | 2/2017 | Volpe et al. | |
| 9,619,806 B2 | 4/2017 | Blackhurst et al. | |
| 9,648,496 B2 | 5/2017 | Loughlin-Mchugh et al. | |
| 9,756,403 B2 | 9/2017 | Proud | |
| 9,810,767 B1 | 11/2017 | Hamilton | |
| 9,818,098 B2 | 11/2017 | Royyuru et al. | |
| 9,824,349 B2 | 11/2017 | Xing et al. | |
| 10,147,076 B2 | 12/2018 | Zhou et al. | |
| 10,185,946 B2 | 1/2019 | Bowman et al. | |
| 10,204,148 B2 | 2/2019 | Madisetti et al. | |
| 10,360,760 B2 | 7/2019 | Northrup et al. | |

(Continued)

*Primary Examiner* — Hamza N Algibhah

(57) ABSTRACT

An apparatus for conducting an interaction through established connections using ultra-wideband comprises a processor associated with a server. The processor is configured to receive a request to initiate an interaction between a grouping and an entity device associated with an entity. The processor is further configured to receive user device information for each user device in the grouping based on universal device identifiers. The processor is further configured to determine an account associated with a user based on comparing the received user device information to the stored user device information. The processor is further configured to transmit the interaction to each user device within the grouping. In response to receiving a request from one of the user devices in the grouping to split the interaction, the processor is further configured to conduct at least a first part of a split interaction with the determined account associated with the user.

20 Claims, 3 Drawing Sheets

(56) References Cited

U.S. PATENT DOCUMENTS

| | | | |
|---|---|---|---|
| 10,380,573 B2 | 8/2019 | Lin et al. | |
| 10,386,454 B2 | 8/2019 | Wang et al. | |
| 10,395,238 B2 | 8/2019 | Griffin et al. | |
| 10,395,253 B2 | 8/2019 | Hessler | |
| 10,475,031 B2* | 11/2019 | Cheong | G06Q 20/204 |
| 10,489,759 B2 | 11/2019 | Hessler | |
| 10,552,645 B2 | 2/2020 | Krawczewicz et al. | |
| 10,575,125 B2 | 2/2020 | Zises | |
| 10,672,244 B2 | 6/2020 | Jones et al. | |
| 10,692,085 B2 | 6/2020 | Zagarese et al. | |
| 10,805,349 B2 | 10/2020 | Shaw et al. | |
| 10,853,592 B2 | 12/2020 | Rodriguez et al. | |
| 10,891,614 B2 | 1/2021 | Patel | |
| 10,925,102 B2 | 2/2021 | Neafsey et al. | |
| 10,972,911 B2 | 4/2021 | Lerch et al. | |
| 10,984,411 B1* | 4/2021 | Hayes | G06Q 20/3829 |
| 10,993,073 B2 | 4/2021 | Jones | |
| 11,030,605 B2 | 6/2021 | Keshan et al. | |
| 11,164,174 B2 | 11/2021 | Artman et al. | |
| 11,288,661 B2* | 3/2022 | Hammad | G06Q 20/326 |
| 2005/0114262 A1* | 5/2005 | Howard | G06Q 20/102 |
| | | | 709/224 |
| 2010/0078471 A1* | 4/2010 | Lin | G06Q 40/02 |
| | | | 235/379 |
| 2010/0082481 A1* | 4/2010 | Lin | G06Q 20/3278 |
| | | | 705/41 |
| 2011/0119155 A1* | 5/2011 | Hammad | G06Q 20/42 |
| | | | 235/382 |
| 2012/0290376 A1* | 11/2012 | Dryer | G06Q 20/385 |
| | | | 705/14.23 |
| 2012/0316963 A1* | 12/2012 | Moshfeghi | G06Q 20/327 |
| | | | 705/14.58 |
| 2015/0310408 A1* | 10/2015 | Anderson | G06Q 10/02 |
| | | | 705/39 |
| 2016/0155090 A1 | 6/2016 | Folk et al. | |
| 2016/0227045 A1* | 8/2016 | Hunt | H04M 3/42297 |
| 2016/0253651 A1* | 9/2016 | Park | G06Q 20/34 |
| | | | 705/39 |
| 2017/0186015 A1* | 6/2017 | Jin | G06Q 20/308 |
| 2017/0193468 A1 | 7/2017 | Chougule et al. | |
| 2017/0270499 A1* | 9/2017 | Coffman | G06Q 20/14 |
| 2019/0007381 A1* | 1/2019 | Isaacson | G06Q 20/12 |
| 2019/0392428 A1* | 12/2019 | Bol | G06Q 20/14 |
| 2021/0142325 A1 | 5/2021 | Patel | |
| 2021/0248584 A1* | 8/2021 | O'Toole | G06Q 20/223 |
| 2022/0156339 A1* | 5/2022 | Grajales | G06F 16/9554 |

* cited by examiner

SYSTEM AND METHOD USING PEER-TO-PEER CONNECTIONS WITH ULTRA-WIDEBAND FOR AN INTERACTION

TECHNICAL FIELD

The present disclosure relates generally to network communications. More particularly, in certain embodiments, the present disclosure is related to a system and method using peer-to-peer connections with ultra-wideband for an interaction.

BACKGROUND

A group of users faces challenges when attempting to conduct a single interaction that involves more than two parties. Existing electronic interaction technologies do not equip these users to perform an interaction to be distributed between two or more users.

SUMMARY

The present disclosure provides a system for using peer-to-peer connections with ultra-wideband for an interaction. An entity device transmits a beacon signal to connect to one or more user devices in proximity to the entity device. Once connected, the entity device requests a server to initiate an interaction session between the entity device and a grouping of one or more user devices in order to perform an interaction. The server receives user device information to identify each user in the grouping, determines an account associated with the user device information, and conducts the interaction session between the entity device and the grouping of one or more user devices. The server may further split the interaction among the one or more user devices if requested by at least one of the user devices.

In an embodiment, an apparatus for conducting an interaction through established connections using ultra-wideband comprises a memory and a processor. The memory is configured to store a plurality of accounts associated with a plurality of users and store user device information associated with each one of the plurality of accounts. The processor is operably coupled to the memory and configured to receive a request to initiate an interaction between a grouping and an entity device associated with an entity, wherein the grouping comprises a first user device associated with a first user and a second user device associated with a second user, wherein each of the first user device and second user device has established a peer-to-peer connection with the entity device. The processor is further configured to receive user device information for each of the first user device and second user device based on universal device identifiers and to determine an account associated with each of the first user and the second user based on comparing the received user device information to the stored user device information. The processor is further configured to transmit the interaction to each one of the first user device and the second user device within the grouping. In response to receiving a request from one of the first user device and the second user device in the grouping to split the interaction, the processor is configured to conduct a first part of a split interaction with the determined account associated with the first user and to conduct a second part of the split interaction with the determined account associated with the second user.

Previous technologies used for establishing and splitting an interaction suffers from technical problems. For example, this disclosure recognizes that the entity device needs identifying information for a given user prior to performing an interaction. In this example, the identifying information would need to be determined and communicated to an appropriate server operable to conduct the interaction with an account of the given user. Identifying information is not readily available to the entity device, and each user would have to be authenticated in order to search for his/her respective account information for conducting the interaction.

Certain embodiments of this disclosure provide unique solutions to the technical problems identified above by providing a system for using peer-to-peer connections with ultra-wideband for an interaction. For example, the disclosed system provides several technical advantages and practical applications, which include but are not limited to: 1) establishing peer-to-peer connections with one or more user devices through ultra-wideband; 2) technology for determining user device information based on a universal device identifier; 3) technology for establishing an interaction session between a grouping of user devices and an entity device, where the entity device determines and monitors the grouping; and 4) splitting an interaction within the interaction session between two or more user devices of the grouping. The disclosed system may establish peer-to-peer connections based on ultra-wideband communication protocols. Ultra-wideband operates across a wide bandwidth that allows for the transmission of a large amount of signal energy without interfering with conventional narrowband and carrier wave transmission in the same frequency band. This can be used to capture accurate spatial & directional data. As such, this disclosure may improve the function of computer systems used to conduct an interaction with a plurality of user devices within one interaction session and associated hardware infrastructures, such that, for example, the appropriate hardware or user action (e.g., processing, memory, and networking resources) can be made available for other prioritized operations.

The disclosed system may further be integrated into an additional practical application of improving underlying operations of computing systems tasked to initiate and conduct interaction sessions with one or more users. For example, the disclosed system may reduce processing, memory, and time resources of an entity device for identifying a given user for each potential interaction. A separate server may analyze user device information associated with a user device of each user to determine accounts to be used in the interaction sessions and then may communicate to each user device during the interaction session.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
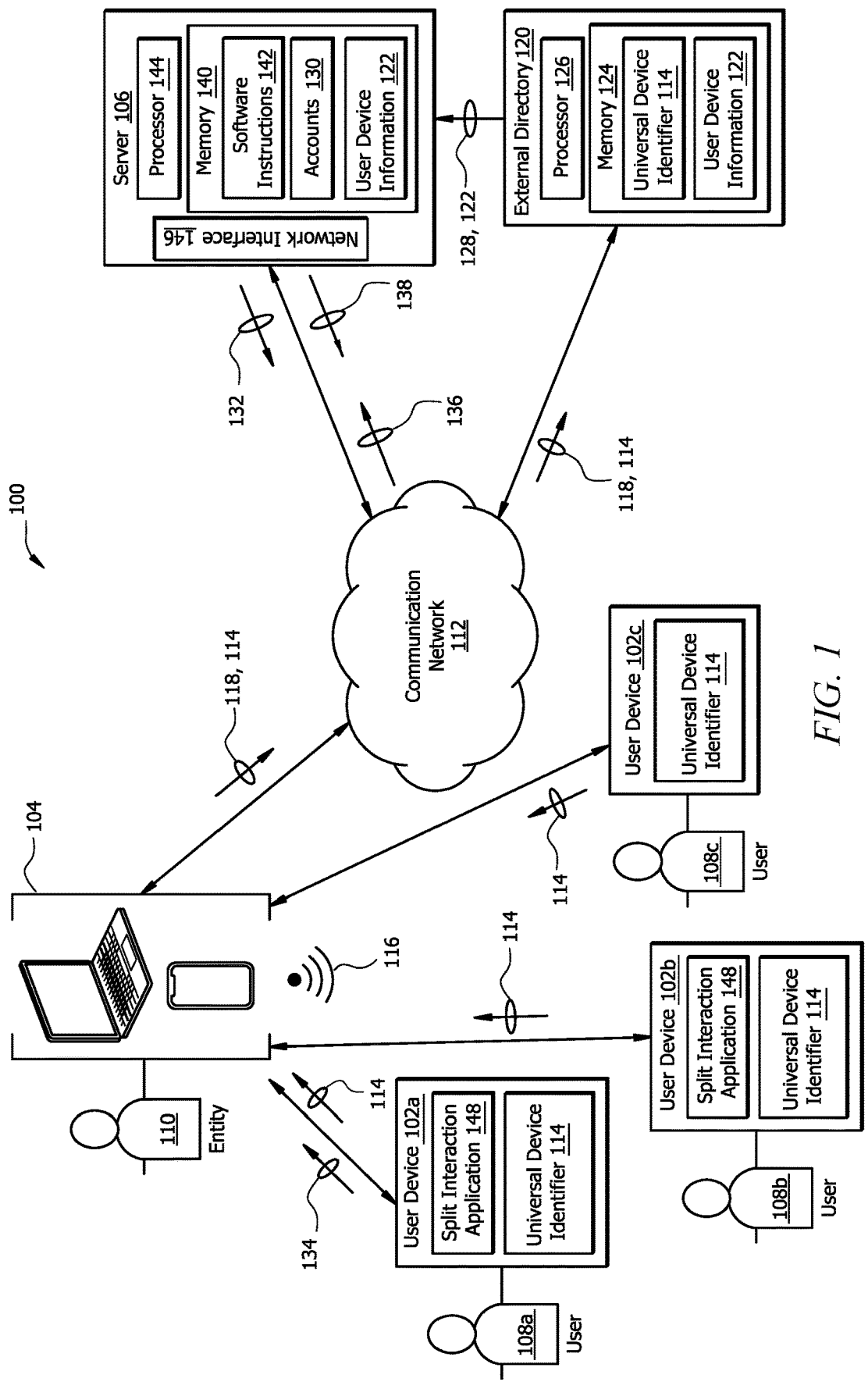
FIG. 1 is a schematic diagram of an example system for using peer-to-peer connections with ultra-wideband for an interaction.
Figure 2:
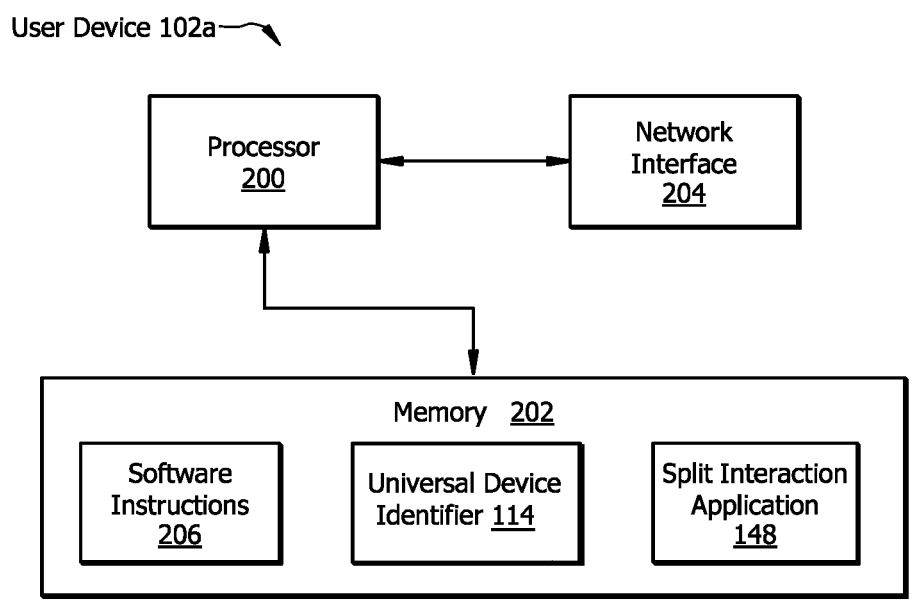
FIG. 2 is a block diagram of an example user device of the system of FIG. 1.
Figure 3:
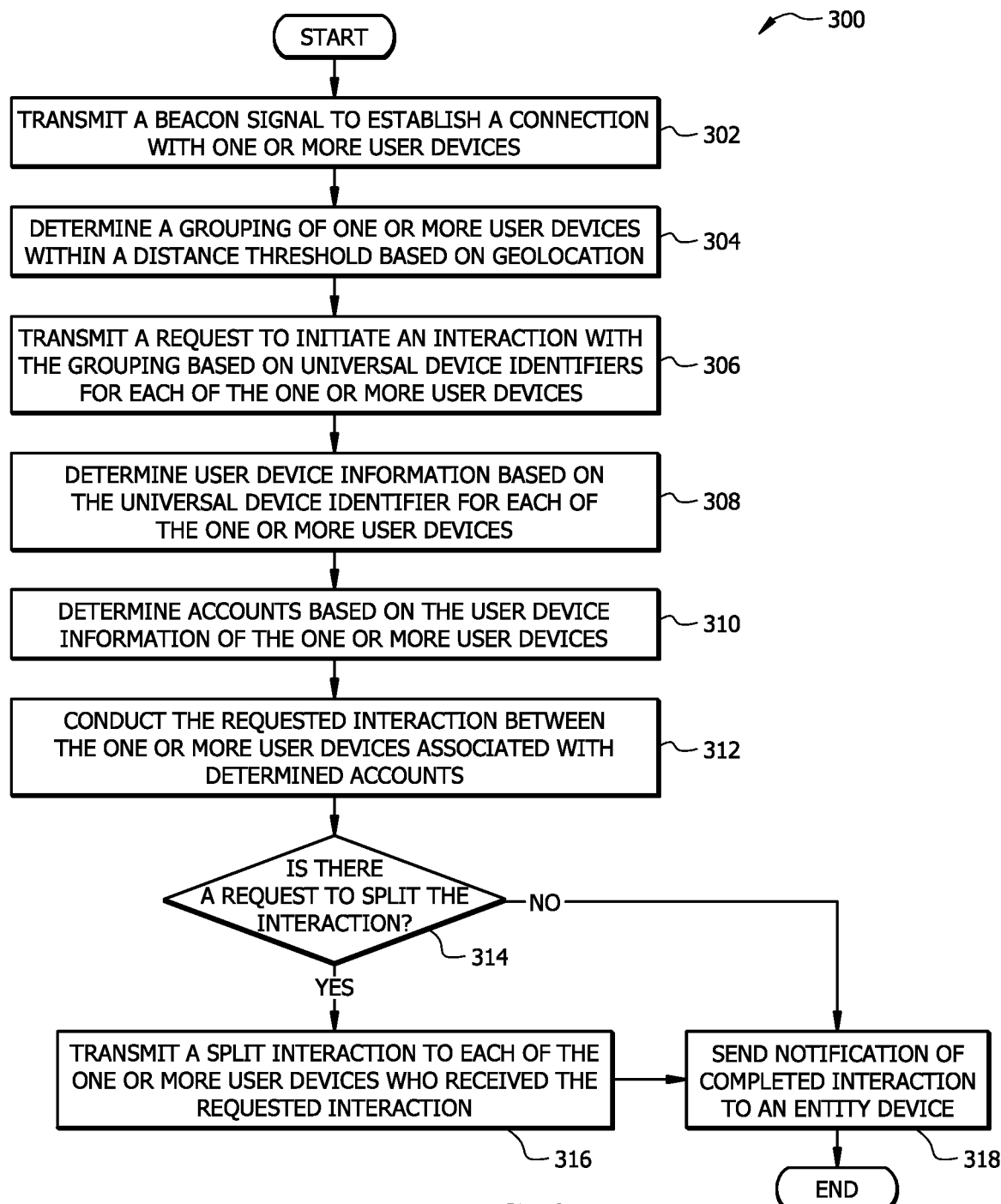
FIG. 3 is a flow diagram illustrating an example operation of the system of FIG. 1.

This disclosure provides solutions to the aforementioned and other problems of previous technology by using peer-to-peer connections with ultra-wideband for an interaction. FIG. 1 is a schematic diagram of an example system for using peer-to-peer connections with ultra-wideband for an interaction. FIG. 2 is a block diagram of an example user device of the system of FIG. 1. FIG. 3 is a flow diagram illustrating an example operation of the system of FIG. 1.
Example System for Using Peer-to-Peer Connections with Ultra-Wideband for an Interaction FIG. 1 illustrates a schematic diagram of an example system 100 configured to facilitate an interaction between user devices and an entity device through peer-to-peer connections using ultra-wideband. The system 100 may include a first user device 102a, a second user device 102b, a third user device 102c, an entity device 104, and a server 106. A first user 108a is associated with the first user device 102a, a second user 108b is associated with the second user device 102b, a third user 108c is associated with the third user device 102c, and a first entity 110 is associated with the entity device 104. The system 100 may be communicatively coupled to a communication network 112 and may be operable to transmit data between each one of the first, second, and third user devices 102a, 102b, and 102c (collectively referred to herein as "the plurality of user devices 102") and the server 106 through the communication network 112. In general, the system 100 may improve electronic interaction technologies by managing an interaction session between a grouping of the plurality of user devices 102 and the entity device 104 in cases where identifying information associated with each user is unknown to the entity device 104 from which the interaction session is initiated.

For example, in a particular embodiment, three users (for example, the first user 108a, second user 108b, and third user 108c) may be located at a restaurant. Upon entering a predetermined area, such as through the front door of the main entrance, each user device of each user (for example, the first user device 102a, second user device 102b, and third user device 102c) may communicatively couple to an entity device associated with the restaurant (for example, the entity device 104). The entity device may transmit a beacon signal 116 using ultra-wideband communication protocols to initiate establishing a peer-to-peer connection between each user device and the entity device. As the users are seated at a determined location, they will be designated as a grouping based on the geolocation information provided by each user device to the entity device. The grouping of users may be presented with a bill while at the restaurant comprising itemized interactions for all three users via their respective user devices.

Before there is a determination as to which user will pay the bill, the entity device may initiate an interaction session between the entity device and the grouping of users. The entity device may transmit a signal 118 requesting to initiate an interaction session between the grouping of user devices and the entity device. As the entity device may not have identifying information associated with each user, the entity device may provide a universal device identifier 114 (for example, a string of characters unique to a specific device) to be used in identifying the appropriate user within the grouping for conducting an interaction. For example, each user device may transmit the universal device identifier 114 associated with that user device to the entity device after the peer-to-peer connection has been established. The universal device identifier 114 may be operable to identify whether a given user is associated with the server 106, wherein the server 106 initiates the interaction session and conducts the interaction. The entity device may transmit the signal 118 further comprising the universal device identifier 114 associated with each user device.

The signal 118 and universal device identifier 114 may be received by an external directory 120 operable to maintain a plurality of universal device identifiers 114 and user device information 122 (for example, phone number, email address, etc.). The external directory 120 may be accessible and communicatively coupled to the server 106 and one or more external, third-party servers. The external directory 120 may be a suitable server (e.g., including a physical server and/or virtual server) operable to store data in a memory 124 and/or provide access to application(s) or other services. Memory 124 includes software instructions that, when executed by a processor 126, cause the external directory 120 to perform one or more functions described herein. For example, the external directory 120 may be a database operable to receive the signal 118 from the entity device comprising the universal device identifier 114 associated with each user device. Once the external directory 120 receives the signal 118, the processor 126 may determine the user device information 122 associated with each user device, and subsequently for each user, based on the received universal device identifier 114. For example, the user device information 122 may be stored in the memory 124, wherein at least a portion of the user device information 122 may be individually associated with each one of the user devices. The processor 126 may be communicatively coupled to the memory 124 and may access the memory 124 to determine the user device information 122 for the user devices stored in the memory 124. The processor 126 may be further operable to transmit a signal 128 to the server 106 comprising the determined user device information 122.

In this example, the server 106 may receive the signal 128 and the determined user device information 122 for each user device of each user within the established grouping. The server 106 may be further operable to determine an account 130 associated with each user based on the received determined user device information 122 from the external directory 120. For example, the server 106 may store user device information 122 associated with an existing account 130 for a given user. The server 106 may compare the received determined user device information 122 to the stored user device information 122 in order to determine the account 130 associated with the given user. The server 106 may transmit a signal 132 to each user device associated with each account 130 identified based on the received determined user device information 122 to establish the interaction session in order to conduct an interaction between the grouping and the entity device.

In an embodiment, one of the users may elect to conduct the interaction (i.e., pay the entirety of the bill). In another embodiment, the users may elect to split the interaction. The server 106 may receive a signal 134 requesting to split the interaction from at least one of the users within the grouping. In response to receiving the signal 134 requesting to split the interaction, the server 106 may produce a split interaction and transmit the split interaction to each one of the user devices. The value of the split interaction may be evenly distributed between the user devices or may be customized by one of the users. The server 106 may receive one or more signals 136 authorizing the server to conduct a portion of the split interaction from one or more of the user devices. For example, the server 106 may receive signals 136 from both the first user device 102*a* and second user device 102 authorizing the server 106 to conduct a first part of the split interaction by the first user device 102*a* and a second part of the split interaction by the second user device 102*b*. After completing the split interaction, the server 106 may transmit a signal 138 to the entity device 104 indicating that the original interaction was split and that the split interaction has been completed by the grouping of users.

The server 106 is generally a suitable server (e.g., including a physical server and/or virtual server) operable to store data in a memory 140 and/or provide access to application(s) or other services. The server 106 may be a backend server associated with a particular group that facilitates conducting interactions between entities and one or more users. Details of the operations of the server 106 are described in conjunction with FIG. 3. Memory 140 includes software instructions 142 that, when executed by a processor 144, cause the server 106 to perform one or more functions described herein. Memory 140 may be volatile or non-volatile and may comprise a read-only memory (ROM), random-access memory (RAM), ternary content-addressable memory (TCAM), dynamic random-access memory (DRAM), and static random-access memory (SRAM). Memory 140 may be implemented using one or more disks, tape drives, solid-state drives, and/or the like. Memory 140 is operable to store software instructions 142, the accounts 130, user device information 122, and/or any other data or instructions. The software instructions 142 may comprise any suitable set of instructions, logic, rules, or code operable to execute the processor 144. In these examples, the processor 144 may be communicatively coupled to the memory 140 and may access the memory 140 for these determinations.

Processor 144 comprises one or more processors operably coupled to the memory 140. The processor 144 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 144 may be a programmable logic device, a microcontroller, a microprocessor, or any suitable combination of the preceding. The one or more processors are configured to process data and may be implemented in hardware or software. For example, the processor 144 may be 8-bit, 16-bit, 32-bit, 64-bit, or of any other suitable architecture. The processor 144 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 142. In this way, processor 144 may be a special-purpose computer designed to implement the functions disclosed herein. In an embodiment, the processor 144 is implemented using logic units, FPGAs, ASICs, DSPs, or any other suitable hardware. The processor 144 is configured to operate as described in FIGS. 1 and 3. For example, the processor 144 may be configured to perform the steps of method 300 as described in FIG. 3.

As illustrated, the server 106 may further comprise a network interface 146. Network interface 146 is configured to enable wired and/or wireless communications (e.g., via communication network 112). The network interface 146 is configured to communicate data between the server 106 and other devices (e.g., entity device 104, first user device 102*a*, second user device 102*b*, etc.), databases, systems, or domain(s). For example, the network interface 146 may comprise a WIFI interface, a local area network (LAN) interface, a wide area network (WAN) interface, a modem, a switch, or a router. The processor 144 is configured to send and receive data using the network interface 146. The network interface 146 may be configured to use any suitable type of communication protocol as would be appreciated by one of skill in the art.

The communication network 112 may facilitate communication within the system 100. This disclosure contemplates the communication network 112 being any suitable network operable to facilitate communication between the entity device 104, first user device 102*a*, second user device 102*b*, third user device 102*c*, and the server 106. Communication network 112 may include any interconnecting system capable of transmitting audio, video, signals, data, messages, or any combination of the preceding. Communication network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In other embodiments, system 100 may not have all of the components listed and/or may have other elements instead of, or in addition to, those listed above.

Each of the plurality of user devices 102 (i.e., first user device 102*a*, second user device 102*b*, and third user device 102*c*) may be any computing device configured to communicate with other devices, such as entity device 104, servers (e.g., server 106), databases, etc. through the communication network 112. Each of the user devices 102 may be configured to perform specific functions described herein and interact with first entity 110, e.g., via its user interfaces. Examples of user devices 102 include but are not limited to mobile phones, wearable devices, tablet computers, laptop computers, servers, etc. Typically, a user 108 (i.e., first user 108*a*, second user 108*b*, or third user 108*c*) who is a client of an organization may access his/her account 130 on a split interaction application 148 from his/her user device 102. The first user device 102*a* and the split interaction application 148 are described in more detail below in FIG. 2.

The entity device 104 may be any suitable device for facilitating an interaction with a grouping comprising any one of the first user device 102*a*, second user device 102*b*, and third user device 102*c*. For example, entity device 104 may be a register, a tablet, a phone, a laptop, a personal computer, a terminal, etc. The entity device 104 may be operable to receive information from a user device when a peer-to-peer connection is established. The entity device 104 then may proceed to request an interaction session with that user device. The entity device 104 may include any appropriate device for communicating with components of system 100 over the communication network 112. As an example and not by way of limitation, entity device 104 may include a computer, a laptop, a wireless or cellular telephone, an electronic notebook, a personal digital assistant, a tablet, or any other device capable of receiving, processing, storing, and/or communicating information with other components of system 100. This disclosure contemplates entity device 104 being any appropriate device for sending and receiving communications over communication network 112. The entity device 104 may also include a user interface, such as a display, a microphone, keypad, or other appropriate terminal equipment usable by a user and/or the first entity 110. In some embodiments, an application executed by entity device 104 may perform the functions described herein. As illustrated, the entity device 104 may be associated with the first entity 110. The first entity 110 may be an individual/organization that provides items or services to the first user 108 in exchange for resources.

Example User Device

FIG. 2 is an example of the first user device 102a of FIG. 1. While the present example is described as the first user device 102a, FIG. 2 can be illustrative of any suitable user device 102 (for example, second user device 102b). The first user device 102a may include a processor 200, a memory 202, and a network interface 204. The first user device 102a may be configured as shown or in any other suitable configuration.

The processor 200 comprises one or more processors operably coupled to the memory 202. The processor 200 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 200 may be a programmable logic device, a microcontroller, a microprocessor, or any suitable combination of the preceding. The processor 200 is communicatively coupled to and in signal communication with the memory 202 and the network interface 204. The one or more processors are configured to process data and may be implemented in hardware or software. For example, the processor 200 may be 8-bit, 16-bit, 32-bit, 64-bit or of any other suitable architecture. The processor 200 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1-3. In some embodiments, the function described herein is implemented using logic units, FPGAs, ASICs, DSPs, or any other suitable hardware or electronic circuitry.

The memory 202 is operable to store any of the information described with respect to FIGS. 1-3 along with any other data, instructions, logic, rules, or code operable to implement the function(s) described herein when executed by processor 200. For example, the memory 202 may store code for application(s) (for example, for split interaction application 148), the universal device identifier 114, and/or software instructions 206, which are described below with respect to FIG. 3. The memory 202 comprises one or more disks, tape drives, or solid-state drives, and may be used as an over-flow data storage device, to store programs when such programs are selected for execution, and to store instructions and data that are read during program execution. The memory 202 may be volatile or non-volatile and may comprise read-only memory (ROM), random-access memory (RAM), ternary content-addressable memory (TCAM), dynamic random-access memory (DRAM), and static random-access memory (SRAM).

Split interaction application 148 may be a software application, a mobile application, a web application, and/or a software infrastructure associated with an organization. The split interaction application 148 is configured to provide a user interface to enable the first user 108a (referring to FIG. 1) to access his/her files, records, transfers to and from other users 108 or an entity 110 (referring to FIG. 1), requests to the organization, etc. In one example, the split interaction application 148 may be a web application on a website. In this example, the first user 108a may access his/her files (via the split interaction application 148) on the website once the first user 108a is authenticated, e.g., by entering his/her username and password. In another example, the split interaction application 148 may be a mobile application that is installed on the first user device 102a, such as a smartphone or a wearable device. In this example, the first user 108a may access his/her files (via the split interaction application 148) when the first user 108a is authenticated, e.g., by entering his/her username and password on the split interaction application 148. In embodiments, the server 106 (referring to FIG. 1) may be associated with the split interaction application 148. The first user device 102a may transmit authorization to the server 106 through the communication network 112 (referring to FIG. 1) in order to conduct an interaction or a split interaction with the first entity device 104 (referring to FIG. 1).

The network interface 204 is configured to enable wired and/or wireless communications. The network interface 204 is configured to communicate data between the first user device 102a and other network devices, systems, or domain(s). For example, the network interface 204 may comprise a WIFI interface, a local area network (LAN) interface, a wide area network (WAN) interface, a modem, a switch, or a router. The processor 200 is configured to send and receive data using the network interface 204. The network interface 204 may be configured to use any suitable type of communication protocol as would be appreciated by one of skill in the art.

Example Operation of the System for Using Peer-to-Peer Connections with Ultra-Wideband for an Interaction FIG. 3 is a flow diagram illustrating an example method 300 of the system 100 of FIG. 1. The method 300 may be implemented using the first user device 102a, second user device 102b, third user device 102c, entity device 104, and the server 106 of FIG. 1. The method 300 may begin at step 302 where the entity device 104 associated with the first entity 110 (referring to FIG. 1), may transmit the beacon signal 116 (referring to FIG. 1) to establish a peer-to-peer connection with each one of the first user device 102a, second user device 102b, and third user device 102c. For example, the first user device 102a, second user device 102b, and third user device 102c may be associated with three users (i.e., the first user 108a, second user 108b, and third user 108c) located at a restaurant. Upon entering a predetermined area, such as through the front door of the main entrance, the entity device 104 may communicatively couple to each one of the first user device 102a, second user device 102b, and third user device 102c. The entity device 104 may transmit the beacon signal 116 using ultra-wideband communication protocols to establish a peer-to-peer connection between each user device 102 and the entity device 104.

At step 304, the entity device 104 may determine a grouping of the three users based on geolocation information provided by each one of the first user device 102a, second user device 102b, and third user device 102c to the entity device 104 through the peer-to-peer connection. For example, each one of the first user device 102a, second user device 102b, and third user device 102c may be located within a distance threshold (for example, two feet) from a designated location, such as a table, wherein the distance threshold is an allowable amount of distance from the designated location.

At step 306, the entity device 104 may transmit the signal 118 (referring to FIG. 1) requesting to initiate an interaction session between the grouping of the first user device 102a, second user device 102b, and third user device 102c and the entity device 104. In an example, the three users may be presented with a bill while at the restaurant comprising itemized interactions for all three users via their respective user devices. In order to display the bill to the users, the entity device 104 must first identify each user. As the entity device 104 may not have identifying information associated with each user, the entity device 104 may provide the universal device identifier 114 (for example, a string of characters unique to a specific device) for each one of the first user device 102a, second user device 102b, and third user device 102c to be used in identifying the appropriate user within the grouping for conducting an interaction with the bill. Each one of the first user device 102a, second user device 102b, and third user device 102c may have transmitted the universal device identifier 114 associated with that user device to the entity device 104 after the peer-to-peer connection had been established.

At step 308, the external directory 120 (referring to FIG. 1) may receive the signal 118 and universal device identifiers 114 for each one of the first user device 102a, second user device 102b, and third user device 102c. Once received, the processor 126 (referring to FIG. 1) of the external directory 120 may determine the user device information 122 (referring to FIG. 1) associated with each one of the first user device 102a, second user device 102b, and third user device 102c, and subsequently for each user, based on the received universal device identifier 114. The processor 126 may further transmit the signal 128 (referring to FIG. 1) to the server 106 comprising the determined user device information 122.

At step 310, the processor 144 (referring to FIG. 1) of the server 106 may receive the signal 128 and the determined user device information 122 for each one of the first user device 102a, second user device 102b, and third user device 102c within the established grouping determined in step 304. The processor 144 may determine the account 130 (referring to FIG. 1) associated with each user based on the received determined user device information 122 from the external directory 120. For example, the server 106 may store user device information 122 associated with an existing account 130 for a given user. The server 106 may compare the received determined user device information 122 to the stored user device information 122 in order to determine the account 130 associated with the given user. In an example, the received determined user device information 122 may identify an existing account 130 for a given user associated with each one of the first user device 102a, second user device 102b, and third user device 102c. The server 106 may transmit the signal 132 (referring to FIG. 1) to each one of the user devices 102 associated with each account 130 identified based on the received determined user device information 122 to establish the interaction session in order to conduct an interaction between the grouping and the entity device 104. In another example, an existing account 130 may be identified for a given user for a portion of the grouping (for example, for the first user 108a and second user 108b but not for third user 108c). In this example, third user 108c may not have an account 130 with the server 106. The server 106 may then transmit the signal 132 to the first user device 102a and second user device 102b to establish an interaction session in order to conduct an interaction between the first user device 102a, second user device 102b, and the entity device 104. In this example, the third user 108c may perform a secondary interaction with any one of the first user device 102a, second user device 102b, or the entity device 104.

At step 312, the processor 144 may conduct the requested interaction between the grouping and the entity device 104. In both examples presented in step 310, the interaction session may be established within the grouping via the split interaction application 148 (referring to FIG. 1). The processor 144 may be operable to send and receive communications to any one of a plurality of user devices 102 through the split interaction application 148. With reference to the restaurant example, the bill for all three users may be displayed upon each one of the first user device 102a, second user device 102b, and third user device 102c via the split interaction application 148. In one example, a singular user, such as the first user 108a, may elect to pay the entirety of the bill. The processor 144 may receive authorization from the first user device 102a to conduct the interaction.

At step 314, the processor 144 may determine whether there is a request to split the interaction amongst the grouping. For example, any one of the users associated with one of the first user device 102a, second user device 102b, and third user device 102c may elect to split the interaction evenly amongst the remaining users. The processor 144 may receive the signal 134 (referring to FIG. 1) requesting to split the interaction from at least one of the users within the grouping. If the processor 144 determines that there is a request to split the interaction, the method 300 proceeds to step 316. Otherwise, the method 300 proceeds to step 318.

At step 316, in response to receiving the signal 134 requesting to split the interaction, the processor 144 may produce a split interaction and transmit the split interaction to each one of the first user device 102a, second user device 102b, and third user device 102c. The value of the split interaction may be evenly distributed between the first user device 102a, second user device 102b, and third user device 102c or may be customized by one of the users (for example, 50% of the value of the interaction to the first user device 102a, 25% to the second user device 102b, and 25% to the third user device 102c). The processor 144 may then receive one or more signals 136 (referring to FIG. 1) authorizing the server 106 to conduct a portion of the split interaction from one or more of the user devices 102. For example, the processor 144 may receive signals 136 from both the first user device 102a and second user device 102 authorizing the server 106 to conduct a first part of the split interaction by the first user device 102a and a second part of the split interaction by the second user device 102b.

At step 318, the processor 144 may transmit the signal 138 (referring to FIG. 1) to the entity device 104 indicating that the interaction has been completed. If the method 300 proceeds from step 314 directly to step 318, the signal 138 may indicate that the interaction was not split. If the method 300 proceeds from step 316 to step 318, the signal 138 may indicate that the original interaction was split and that the split interaction has been completed by the grouping of the first user device 102a, second user device 102b, and third user device 102c. After conducting the interaction session, the method 300 proceeds to end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus for conducting an interaction through established connections using ultra-wideband, comprising:
   a memory operable to:
      store a plurality of accounts associated with a plurality of users; and
      store user device information associated with each one of the plurality of accounts; and
   a processor, operably coupled to the memory, configured to:
      receive a request to initiate an interaction between a grouping and an entity device associated with an entity, wherein the grouping comprises a first user device associated with a first user and a second user device associated with a second user, wherein each of the first user device and second user device has established a peer-to-peer connection with the entity device;
      receive user device information for each of the first user device and second user device based on universal device identifiers;
      determine an account associated with each of the first user and the second user based on comparing the received user device information to the stored user device information;
      transmit the interaction to each one of the first user device and the second user device within the grouping; and
      in response to receiving a request from one of the first user device and the second user device in the grouping to split the interaction:
         conduct a first part of a split interaction with the determined account associated with the first user; and
         conduct a second part of the split interaction with the determined account associated with the second user.

2. The apparatus of claim 1, wherein each of the peer-to-peer connections is supported by an ultra-wideband communication protocol.

3. The apparatus of claim 1, wherein the grouping is established by determining that each one of the first user device and the second user device is located within a distance threshold from a fixed location based, at least in part, on geolocation information.

4. The apparatus of claim 1, wherein the processor is further configured to:
   transmit the split interaction to each one of the first user device and the second user device;
   receive an authorization to conduct the first part of the split interaction from the first user device; and
   receive an authorization to conduct the second part of the split interaction from the second user device.

5. The apparatus of claim 1, wherein the processor is further configured to:
   send a notification to the entity device indicating that the interaction was split and that the split interaction has been completed after conducting the first part and second part of the split interaction.

6. The apparatus of claim 1, wherein the grouping further comprises a third user device associated with a third user, wherein the third user device has established a peer-to-peer connection with the entity device, wherein the processor is further configured to:
   receive user device information for the third user device based on the universal device identifier; and
   determine an account associated with the third user based on comparing the received user device information to the stored user device information.

7. The apparatus of claim 6, wherein the processor is further configured to:
   in response to a determination of the account associated with the third user:
      transmit the interaction to each one of the first user device, the second user device, and the third user device; and
      conduct a third part of the split interaction with the determined account associated with the third user.

8. A method for conducting an interaction through established connections using ultra-wideband, comprising:
   receiving a request to initiate an interaction between a grouping and an entity device associated with an entity, wherein the grouping comprises a first user device associated with a first user and a second user device associated with a second user, wherein each of the first user device and second user device has established a peer-to-peer connection with the entity device;
   receiving user device information for each of the first user device and second user device based on universal device identifiers;
   determining an account associated with each of the first user and the second user based on comparing the received user device information to stored user device information;
   transmitting the interaction to each one of the first user device and the second user device within the grouping; and
   in response to receiving a request from one of the first user device and the second user device in the grouping to split the interaction:

conducting a first part of a split interaction with the determined account associated with the first user; and conducting a second part of the split interaction with the determined account associated with the second user.

9. The method of claim 8, wherein each of the peer-to-peer connections is supported by an ultra-wideband communication protocol.

10. The method of claim 8, wherein the grouping is established by determining that each one of the first user device and the second user device is located within a distance threshold from a fixed location based, at least in part, on geolocation information.

11. The method of claim 8, further comprising:
transmitting the split interaction to each one of the first user device and the second user device;
receiving an authorization to conduct the first part of the split interaction from the first user device; and
receiving an authorization to conduct the second part of the split interaction from the second user device.

12. The method of claim 8, further comprising:
sending a notification to the entity device indicating that the interaction was split and that the split interaction has been completed after conducting the first part and second part of the split interaction.

13. The method of claim 8, wherein the grouping further comprises a third user device associated with a third user, wherein the third user device has established a peer-to-peer connection with the entity device, further comprising:
receive user device information for the third user device based on the universal device identifier; and
determine an account associated with the third user based on comparing the received user device information to the stored user device information.

14. The method of claim 13, further comprising:
in response to a determination of the account associated with the third user:
transmitting the interaction to each one of the first user device, the second user device, and the third user device; and
conducting a third part of the split interaction with the determined account associated with the third user.

15. A non-transitory computer-readable medium comprising instructions that are configured, when executed by a processor, to:
receive a request to initiate an interaction between a grouping and an entity device associated with an entity, wherein the grouping comprises a first user device associated with a first user and a second user device associated with a second user, wherein each of the first user device and second user device has established a peer-to-peer connection with the entity device;
receive user device information for each of the first user device and second user device based on universal device identifiers;
determine an account associated with each of the first user and the second user based on comparing the received user device information to stored user device information;
transmit the interaction to each one of the first user device and the second user device within the grouping; and
in response to receiving a request from one of the first user device and the second user device in the grouping to split the interaction:
conduct a first part of a split interaction with the determined account associated with the first user; and
conduct a second part of the split interaction with the determined account associated with the second user.

16. The non-transitory computer-readable medium of claim 15, wherein each of the peer-to-peer connections is supported by an ultra-wideband communication protocol.

17. The non-transitory computer-readable medium of claim 15, wherein the grouping is established by determining that each one of the first user device and the second user device is located within a distance threshold from a fixed location based, at least in part, on geolocation information.

18. The non-transitory computer-readable medium of claim 15, wherein the instructions are further configured to:
transmit the split interaction to each one of the first user device and the second user device;
receive an authorization to conduct the first part of the split interaction from the first user device; and
receive an authorization to conduct the second part of the split interaction from the second user device.

19. The non-transitory computer-readable medium of claim 15, wherein the instructions are further configured to:
send a notification to the entity device indicating that the interaction was split and that the split interaction has been completed after conducting the first part and second part of the split interaction.

20. The non-transitory computer-readable medium of claim 15, wherein the grouping further comprises a third user device associated with a third user, wherein the third user device has established a peer-to-peer connection with the entity device, wherein the instructions are further configured to:
receive user device information for the third user device based on the universal device identifier; and
determine an account associated with the third user based on comparing the received user device information to the stored user device information;
in response to a determination of the account associated with the third user:
transmit the interaction to each one of the first user device, the second user device, and the third user device; and
conduct a third part of the split interaction with the determined account associated with the third user.

* * * * *